United States Patent Office 3,296,894
Patented Jan. 10, 1967

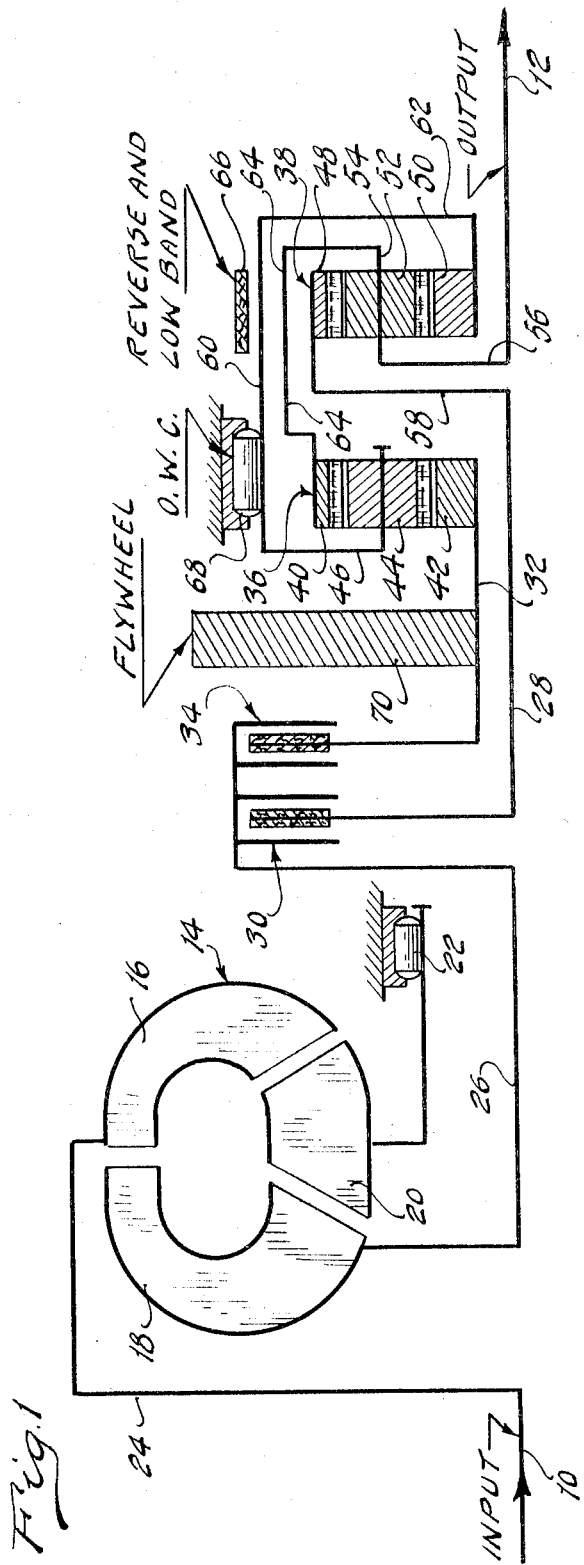

3,296,894
MULTIPLE SPEED RATIO POWER TRANSMISSION MECHANISM WITH BALANCED INERTIA SHIFTS
Richard D. Moan, Dearborn, Mich., assignor to Ford Motor Company, Dearborn, Mich., a corporation of Delaware
Filed Mar. 16, 1964, Ser. No. 352,167
4 Claims. (Cl. 74—751)

My invention relates generally to multiple speed ratio power transmission mechanisms for use in an automotive vehicle driveline for delivering power from the vehicle engine to the vehicle traction wheels. More particularly, it relates to an improved planetary gear system for use in an automotive vehicle driveline wherein provision is made for compensating for changes in the inertia of the engine during speed ratio changes by balancing the engine inertia forces during the shift interval. This will provide a smooth transition from one ratio to another under torque without interrupting the torque delivery path from the engine to the traction wheels.

In a preferred embodiment of my invention, the power flow path is defined by two simple planetary gear sets. Three friction torque establishing devices are employed for controlling the relative motion of the elements of the gear sets to provide two forward driving speed ratios and a single reverse speed ratio. One of the friction torque establishing devices is in the form of a friction brake for anchoring a reaction element of the gear system during underdrive operation in a low-speed ratio. An overrunning coupling, however, may be employed in lieu of the friction brake to make possible a non-synchronous speed ratio shift from the low-speed ratio to a direct drive ratio without the necessity for providing an additional friction element to disable the overrunning coupling during operation in reverse drive.

Direct drive operation is accomplished by clutching together two elements of the gear system for rotation in unison as the low speed ratio reaction brake mechanism is released.

In certain gear systems that are known in the automotive vehicle industry a friction brake band is employed for anchoring one element of the gear system to provide torque reaction when the mechanism is conditioned for underdrive ratio operation. When such conventional gear systems are conditioned for direct drive operation, the reaction element of the gear system is caused to rotate in the direction of rotation of the driving member of the gear system as the direct drive clutch structure frictionally connects together two torque delivery elements. When the gear system is conditioned for reverse drive operation, the element of the gear system that acts as a reaction point during low speed ratio operation is caused to rotate in a direction opposite to the direction of rotation of the power input shaft. Such a gear system obviously cannot accommodate an overrunning coupling for anchoring the reaction element that is employed during low-speed ratio forward drive operation unless the stationary race of the overrunning coupling is declutched from the stationary transmission housing. This, of course, would require an additional selectively releasable friction coupling device.

In my improved system I employ readily an overrunning coupling for anchoring the reaction element of the gear system during low-speed ratio forward drive operation, and this provides the mechanism with a pickup shift from the low-speed ratio to the direct drive ratio. The pickup shift feature may be introduced without the necessity for adding an additional friction torque establishing device for controlling the action of the stationary race of the overrunning coupling. The provision of a gear system having this advantage is one object of my invention.

I am aware also of certain other prior art constructions that employ clutch and brake arrangements with appropriate timing valve systems for conditioning the elements of a planetary gear system for speed ratio changes. When such arrangements are used in an automotive vehicle driveline, a speed ratio change is accompanied by a large engine inertia torque as the engine speed is caused to change to satisfy the new speed ratio of the gear system. This inertia torque and the engine torque itself are additive, and the combined torque is distributed through the gear system during the speed ratio change. This in turn causes an undesirable lurching of the vehicle and produces a sensation commonly referred to as "shift feel." To overcome this characteristic and to balance the inertia torque, certain prior art arrangements employ a relatively large diameter inertia flywheel that is connected to the reaction element of the gear system. The inertia torque of the engine then will be opposed and substantially balanced by the inertia torque that is created due to the change in the speed of rotation of the flywheel.

These conventional arrangements require a flywheel of substantial mass and of a relatively large diameter. With my improved system, however, I may employ an inertia flywheel of substantially less mass and reduced radial dimensions by connecting it drivably to an element of my gear system that normally rotates in a direction opposite to the direction of rotation of the engine during operation of the mechanism in the low-speed ratio range. As an upshift occurs to the higher speed ratio, the reversely rotating element of the gear system is caused to slow up, to stop and then to rotate in the opposite direction. The flywheel structure that is connected to this element, of course, follows the same motion pattern so that the flywheel is caused to create an inertia torque that is equal and opposite to the engine inertia torque. The absolute r.p.m. change of the flywheel is substantially greater than the actual change in engine speed. Since the engine speed change and the flywheel speed change occur over the same shift time interval, the actual acceleration of the flywheel is much higher than the corresponding deceleration of the engine. Because of this characteristic the moment of inertia of the flywheel may be less than the corresponding moment of inertia of the engine. I contemplate that the moment of inertia of the flywheel need only be approximately one-quarter of the moment of inertia of the engine.

The provision of a transmission mechanism having the balanced inertia characteristic described in the foregoing paragraphs is another object of my invention.

It is a further object of my invention to provide a gear system capable of providing two forward driving speed ratios and a single reverse speed ratio wherein only two simple planetary gear sets are required and wherein the gear elements of one gear unit may be formed with pitch diameters that are substantially equal to the pitch diameters of the corresponding elements of the other gear unit.

Further objects and features of my invention will become apparent from the following description and from the accompanying drawings wherein:

FIGURE 1 shows in schematic form a cross-sectional assembly view of a power transmission mechanism embodying the features of my invention, and FIGURE 2 is a chart showing the valves of the actual torque acting upon each of the elements with reference to the input torque.

Referring first to FIGURE 1, numeral 10 designates a driving shaft that may correspond to the crankshaft of an internal combustion engine in an automotive vehicle driveline. Numeral 12 designates a driven shaft that may be connected to the vehicle traction wheels through a suitable drive shaft and axle assembly. A hydrokinetic torque converter mechanism is shown generally at 14. By preference the torque converter mechanism 14 is of a so-called high performance type in which the torque ratio for any given speed ratio during operation in the torque converter range is substantially higher than conventional three element torque converters currently used in the automotive vehicle industry.

Converter mechanism 14 includes the bladed impeller 16, a bladed turbine 18 and a bladed stator 20. Impeller 16 includes circumferentially spaced impeller blades that define radial outflow passages. These passages communicate with radial inflow passages defined by turbine blades of the turbine 18. The blades of stator 20 direct fluid from the flow exit region of the turbine 18 to the flow entrance region of the impeller 16. The impeller 16, the turbine 18 and the stator 20 thus are disposed in a fluid flow relationship in a common torus circuit.

Stator 20 may be anchored against rotation in the same direction as the direction of rotation of the impeller, although freewheeling motion of the stator in the opposite direction is permitted. This is accomplished by means of an overrunning brake 22.

Impeller 16 is connected to crankshaft 10 by means of the drive shell 24. The turbine 18 is connected to a turbine shaft 26. This shaft in turn may be connected to a torque delivery shaft 28 by means of a first selectively engagable friction clutch 30.

A second torque delivery shaft in the form of a sleeve 32 surrounds shaft 28, and it may be connected drivably to shaft 26 by means of a selectively engagable friction clutch 34. Clutches 30 and 34 can be applied and released by suitable fluid pressure operated servos in known fashion.

A pair of planetary gear units is shown at 36 and 38. Gear unit 36 includes a ring gear 40, a sun gear 42, planet pinions 44 and a carrier 46. The pinions 44 are rotatably journaled upon the carrier 46, and they are disposed in meshing engagement with sun gear 42 and ring gear 40. Sun gear 42 is connected directly to the sleeve 32.

Gear unit 38 includes a ring gear 48, a sun gear 50, planet pinions 52 and a carrier 54. Pinions 52 are rotatably journaled upon a carrier 54 and they mesh drivably with ring gear 48 and sun gear 50.

Carrier 54 includes a portion 56 which extends radially between the two gear units and which is connected drivably to power output shaft 12. Ring gear 48 is connected to shaft 28 by means of a radial drive member 58 disposed between the gear units.

Carrier 46 is connected to a brake drum 60. This same drum is connected also to sun gear 50 by means of a radial drive member 62.

Ring gear 40 is connected to carrier 54 by means of a drive member 64 located within the drum 60.

A low and reverse friction brake band 66 surrounds brake drum 60. It may be applied and released selectively by means of a suitable fluid pressure operated servo, thereby anchoring selectively the carrier 46 and the sun gear 50. A one-way coupling 68 also may be employed for inhibiting rotation of the drum 60 in one direction, although freewheeling motion in the opposite direction may be accommodated. One race of the coupling 68 can be anchored securely to the transmission housing, not shown.

Sleeve 32 has connected thereto a flywheel 70. As will be explained subsequently, the mass and radial dimensions of the flywheel 70 will be relatively reduced in comparison to corresponding flywheels used in certain prior art gearing systems. It rotates in unison with the sun gear 42.

To condition the mechanism for low-speed ratio forward drive operation, the front clutch 30 is engaged. Turbine torque then is delivered to the ring gear 48. Sun gear 50 acts as a reaction member, and as the carrier 54 is driven in a forward driving direction at a reduced speed ratio, its forward driving motion of course is transmitted directly to the shaft 12. It will be observed that during low speed ratio forward drive operation, ring gear 40 will be driven at the same speed as the carrier 54. Since carrier 46 is anchored by the overrunning coupling 68, sun gear 42 is driven in a reverse direction. This of course causes flywheel 70 to rotate at a speed that is close to engine speed, although in the opposite direction.

If desired, a friction brake band 66 may be applied to anchor the sun gear 50. This then will permit the mechanism to accommodate coasting torque while engine braking.

An upshift to the high speed ratio can be accomplished by applying rear clutch 34 while clutch 30 remains applied. If we assume that the brake band 66 is released at this time, the overrunning coupling 68 will begin to freewheel as the elements of the gear system become locked together for rotation in unison. The turbine torque then is delivered directly through the clutches and through the gear system to the power output shaft 12.

As the clutch 34 becomes engaged, the flywheel 70 ceases rotating in a backward direction and begins to rotate in a forward driving direction. After the shift is completed, the flywheel 70 rotates at engine speed in the same direction of rotation as the engine. Thus the inertia torque of the flywheel opposes and balances the inertia torque of the engine during the shift interval. This eliminates an undesirable surge of inertia forces through the gear system during the shift interval, and the shift quality is correspondingly improved.

In FIGURE 2 I have illustrated in graphic form the magnitudes of the driving torque acting upon the front clutch, the rear clutch, the overrunning coupling, the band, and the power output shaft. In each case the torque is expressed as a factor times the input torque.

The mechanism may be conditioned for reverse drive operation by releasing the front clutch and engaging the rear clutch 34. At the same time, the brake band 66 is applied. Thus carrier 46 becomes a reaction member and the ring gear 40 is driven in a reverse direction. This reverse motion is distributed through the drum 64, through the carrier 54 and through the drive member 56 to the power output shaft 12. If it is assumed that the ring gears are of the same pitch diameter and the sun gears are of the same pitch diameter, and if it is assumed also that the ratio of the sun gear diameter to the ring gear diameter is equal to .6, then the reverse drive ratio will be equal to 1.667. On the other hand, the forward driving low speed ratio will be equal to 1.6.

If desired, the brake band 66 may be applied continuously by means of a suitable manual control thereby inhibiting an upshift from the low-speed ratio to the high-speed ratio.

Having thus described a preferred embodiment of my invention, what I claim and desire to secure by U.S. Letters Patent is:

1. In a power transmission mechanism adapted to deliver driving torque from a driving member to a driven member, a pair of simple planetary gear units, each gear unit comprising a ring gear, a sun gear, planet pinions drivably engagable with said sun and ring gears, and a carrier rotatably supporting said pinions, the ring gear of a first of said gear units being connected to the carrier of a second of said gear units, said driven member being connected to the carrier of said second gear unit, the carrier of said first gear unit being connected to the sun gear of said second gear unit, brake means for anchoring the carrier of said first gear unit and the sun gear of said second gear unit during low speed ratio forward drive operation and during reverse drive operation, first clutch means for connecting the ring gear of said second gear unit to said driving member, second clutch means for connecting the sun gear of said first gear unit to said driving member, and an inertia flywheel drivably connected to the sun gear of said first gear unit.

2. A power transmission mechanism for delivering power from a driving member to a driven member, comprising a pair of simple planetary gear units, each gear unit including a sun gear and a ring gear, a carrier and planet pinions rotatably supported on said carrier in meshing engagement with said sun and ring gears, the ring gear of a first of said gear units being connected to the carrier of second of said gear units, the carrier of said second gear unit being connected to said driven member, the carrier of said first gear unit being connected to the sun gear of said second gear unit, overrunning coupling means for anchoring the carrier of said first gear unit and the sun gear of said second gear unit against rotation in one direction while accommodating freewheeling motion thereof in the opposite direction, first clutch means for connecting the ring gear of said second gear unit to said driving member and second clutch means for connecting the sun gear of said first gear unit to said driving member, and an inertia flywheel connected drivably to the sun gear of said first gear unit, said mechanism being conditioned for direct drive operation upon engagement of both clutch means, said overrunning coupling means acting as a reaction point during low speed ratio forward drive operation with said second clutch means disengaged.

3. A power transmission mechanism for delivering power from a driving member to a driven member, comprising a pair of simple planetary gear units, each gear unit including a sun gear and a ring gear, a carrier and planet pinions rotatably supported on said carrier in meshing engagement with said sun and ring gears, the ring gear of a first of said gear units being connected to the carrier of a second of said gear units, the carrier of said second gear unit being connected to said driven member, and carrier of said first gear unit being connected to the sun gear of said second gear unit, overrunning coupling means for anchoring the carrier of said first gear unit and the sun gear of said second gear unit against rotation in one direction while accommodating freewheeling motion thereof in the opposite direction, first clutch means for connecting the ring gear of said second gear unit to said driving member, second clutch means for connecting the sun gear of said first gear unit to said driving member, said mechanism being conditioned for direct drive operation upon engagement of both clutch means, said overrunning coupling means acting as a reaction point during low speed ratio forward drive operation with said second clutch means disengaged, and an inertia flywheel connected to the sun gear of said first gear unit.

4. A power transmission mechanism for delivering power from a driving member to a driven member, comprising a pair of simple planetary gear units, each gear unit including a sun gear and a ring gear, a carrier and planet pinions rotatably supported on said carrier in meshing engagement with said sun and ring gears, the ring gear of a first of said gear units being connected to the carrier of a second of said gear units, the carrier of said second gear unit being connected to said driven member, the carrier of said first gear unit being connected to the sun gear of said second gear unit, overrunning coupling means for anchoring the carrier of said first gear unit and the sun gear of said second gear unit against rotation in one direction while accommodating freewheeling motion thereof in the opposite direction, first clutch means for connecting the ring gear of said second gear unit to said driving member, second clutch means for connecting the sun gear of said first gear unit to said driving member, said mechanism being conditioned for direct drive operation upon engagement of both clutch means, said overrunning coupling means acting as a reaction point during low speed ratio forward drive operation with said second clutch means disengaged, an inertia flywheel connected to the sun gear of said first gear unit, and a friction brake means for anchoring the sun gear of said second gear unit and the carrier of said first gear unit against rotation in each direction, said friction brake means and said second clutch means being engaged during reverse drive operation as said first clutch means is disengaged.

References Cited by the Examiner

UNITED STATES PATENTS

| | | | |
|---|---|---|---|
| 2,241,680 | 5/1941 | Taylor | 74—572 |
| 3,023,636 | 3/1962 | Kelley et al. | 74—572 |
| 3,027,783 | 4/1962 | Kelley | 74—752 |
| 3,091,980 | 6/1963 | Black | 74—752 |
| 3,095,764 | 7/1963 | Peras | 74—763 |
| 3,253,688 | 5/1966 | Livezey | 74—763 |

DAVID J. WILLIAMOWSKY, *Primary Examiner.*

THOMAS C. PERRY, *Examiner.*